(12) United States Patent
Smith

(10) Patent No.: US 6,299,151 B1
(45) Date of Patent: Oct. 9, 2001

(54) FLUID DISTRIBUTION SYSTEM

(75) Inventor: Douglas R. Smith, Hamilton, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/471,871

(22) Filed: Dec. 23, 1999

(51) Int. Cl.[7] ............................................. B23Q 3/08
(52) U.S. Cl. ............................ 269/32; 269/24; 269/900
(58) Field of Search .................................. 269/32, 21, 24, 269/20, 900

(56) References Cited

U.S. PATENT DOCUMENTS

| | | | |
|---|---|---|---|
| 5,161,788 | * | 11/1992 | Guzzoni ................................. 269/20 |
| 5,192,058 | * | 3/1993 | VanDalsem et al. .................. 269/24 |
| 5,316,255 | * | 5/1994 | Marcussen ............................. 269/21 |
| 5,842,690 | * | 12/1998 | Lee et al. ............................... 269/21 |
| 5,899,445 | * | 5/1999 | Kimble .................................. 269/296 |
| 6,139,682 | * | 10/2000 | Iwata .................................... 269/21 |
| 6,173,648 | * | 1/2001 | Misono et al. ......................... 269/21 |
| 6,196,532 | * | 3/2001 | Otwell .................................. 269/21 |

* cited by examiner

*Primary Examiner*—Joseph J. Hail, III
*Assistant Examiner*—Lee Wilson
(74) *Attorney, Agent, or Firm*—Andrew C. Hess; Gerry S. Gressel

(57) ABSTRACT

A fluid distribution system for transporting pressurized fluid. The system includes a plate having a first face and a slot extending along the face between opposite first and second ends of the slot. In addition, the system includes a body having a surface sealingly engaging the first face of the plate and overlying the slot so that a portion of the surface and the slot at least partially define a passage for transporting pressurized fluid between the first and second ends of the slot. A method of making the system is also disclosed.

15 Claims, 4 Drawing Sheets

FLUID DISTRIBUTION SYSTEM

BACKGROUND OF THE INVENTION

The present invention relates generally to a fluid distribution system, and more particularly a fluid distribution system for transporting pressurized fluid to a fluid actuated apparatus of a tooling fixture.

Tooling fixtures are used to hold workpieces during manufacturing operations. One such tooling fixture is described in U.S. patent application Ser. No. 09/432,790, entitled "Workpiece Fixture", filed Nov. 2, 1999, which is hereby incorporated by reference. Frequently, these fixtures include fluid actuated apparatus such as workpiece supports for supporting the workpiece and hydraulic cylinders which activate clamps on the fixtures for holding the workpieces. The apparatus are actuated by pressurized fluid which is transported to the apparatus from a fluid source such as a reservoir and pump.

Some prior art fixtures use flexible or rigid tubing to transport fluid from the source to the apparatus. Although the tubing is relatively inexpensive and easy to install, it is subject to damage and can hinder the manufacturing operations. For instance, the workpiece may hit the tubing and damage it as the workpiece is loaded into the fixture. Further, tools used in the manufacturing operation can damage the tubing. Even if the tubing is not damaged, it can hinder the loading operation or can hinder movement of the tools during the manufacturing operation.

To avoid problems associated with tubing, some fixtures have internal passages for transporting the fluid to the apparatus. Conventional methods of forming these passages require that holes be drilled through the fixture. Frequently, the configuration of the fixture requires that the internal passages have complex shapes. Conventionally, these passages are formed by drilling several intersecting holes and plugging ends of some of the holes. As will be appreciated by those skilled in the art, forming these internal passages, particularly those having complex shapes, using conventional methods is expensive and time consuming.

SUMMARY OF THE INVENTION

Among the several features of the present invention may be noted the provision of a fluid distribution system for transporting pressurized fluid. The system includes a plate having a first face and a slot extending along the first face between opposite first and second ends of the slot. In addition, the system includes a body having a surface sealingly engaging the first face of the plate and overlying the slot so that a portion of the surface and the slot at least partially define a passage for transporting pressurized fluid between the first and second ends of the slot.

In another aspect of the present invention, the system includes a plate having opposite first and second faces and a slot extending through the plate from the first face to the second face and along the plate between opposite first and second ends of the slot. Further, the system includes a first body sealingly engaging the first face of the plate and overlying the slot, and a second body sealingly engaging the second face of the plate and overlying the slot so that the slot and portions of the first and second bodies define a passage for transporting pressurized fluid between the first and second ends of the slot.

In yet another aspect, the present invention includes a method of making a fluid distribution system for transporting pressurized fluid. The method includes the step of forming a slot in a plate having opposite first and second faces so that the slot extends along the plate between opposite first and second ends of the slot. The method also includes the step of bonding a body to the first face of the plate to form a passage for transporting pressurized fluid between the first and second ends of the slot.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
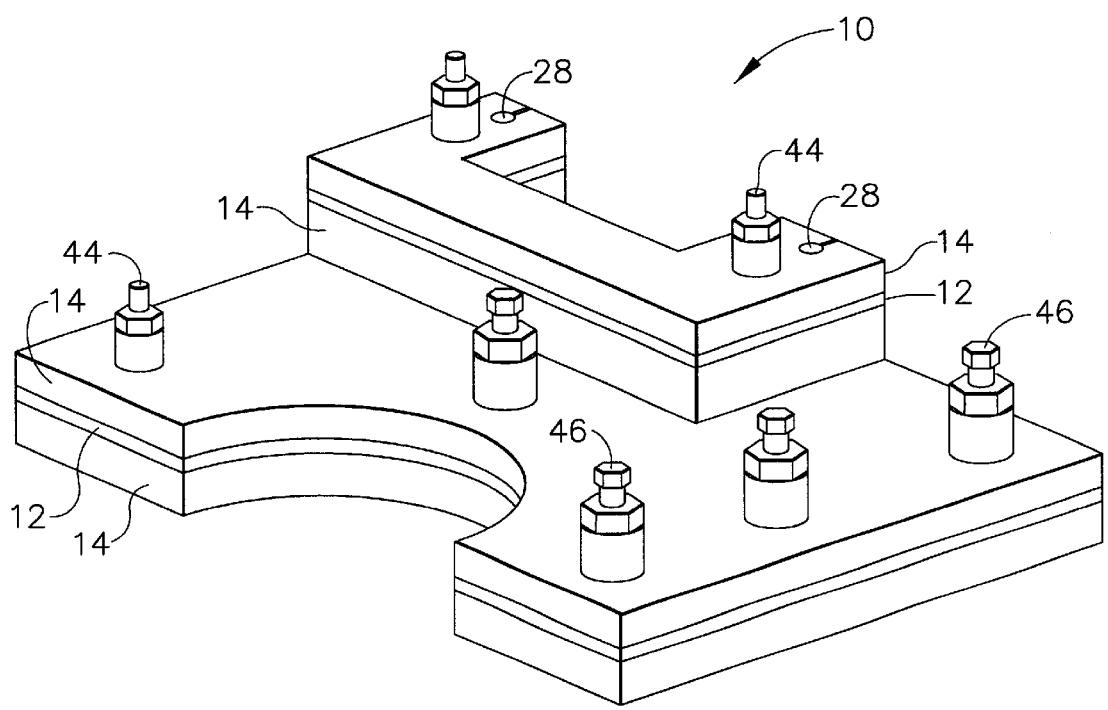
FIG. 1 is a perspective of a fluid distribution system of the present invention.

Referring now to the drawings and in particular to FIG. 1, a fluid distribution system for transporting pressurized fluid is designated in its entirety by the reference numeral 10. The system 10 of one preferred embodiment forms a base of a tooling fixture such as disclosed in U.S. patent application Ser. No. 09/432,790 for holding workpieces (not shown) during manufacturing operations.

Figure 2:
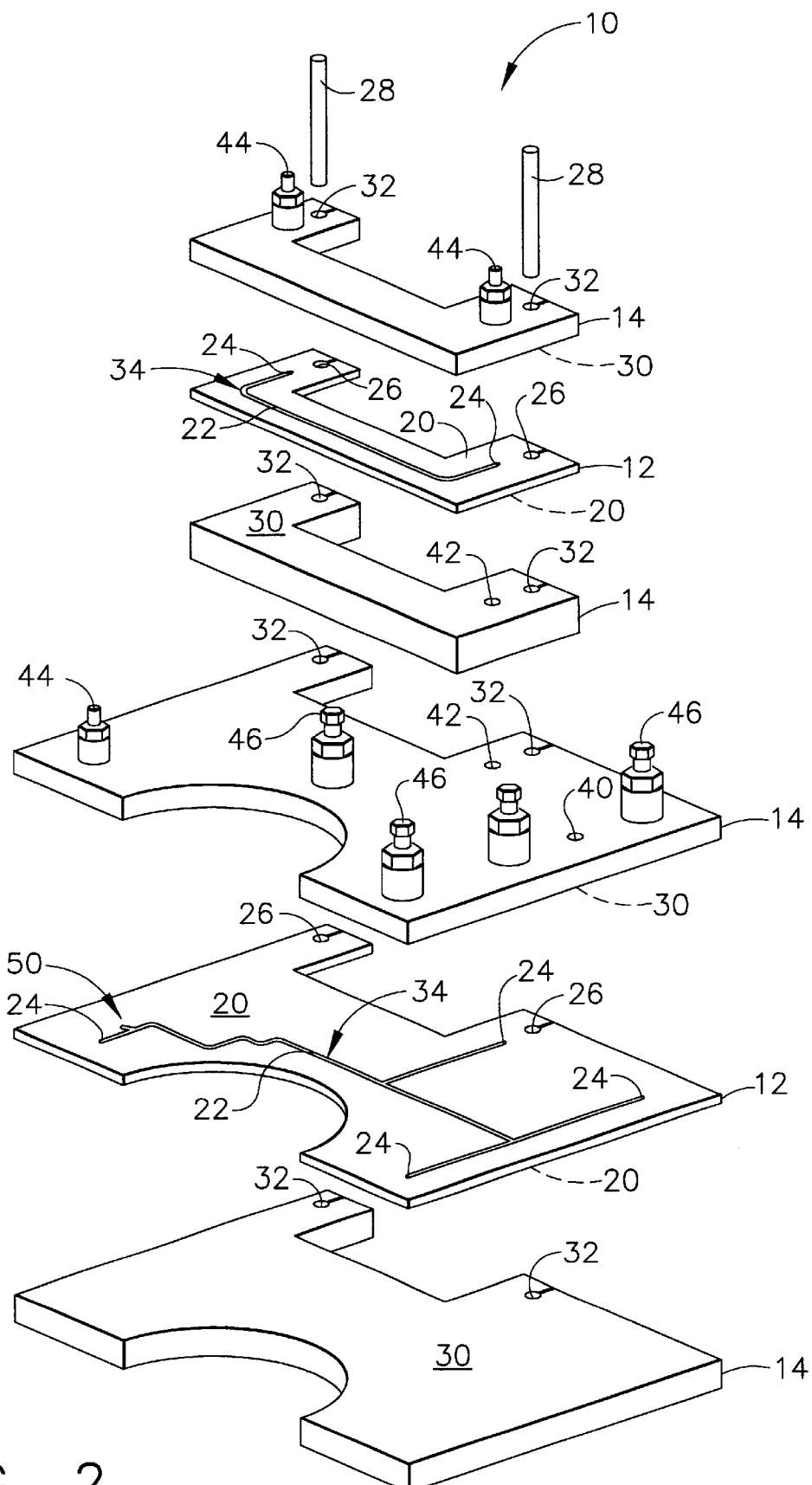
FIG. 2 is a separated perspective of the system.

As illustrated in FIG. 2, the system 10 generally comprises two plates 12 and four bodies 14 laminated together. Although two plates 12 and four bodies 14 are shown in FIG. 2, those skilled in the art will appreciate that fewer or more plates and bodies may be used without departing from the scope of the present invention. Further, although other materials may be used without departing from the scope of the present invention, the plates 12 and bodies 14 of the preferred embodiment are made of tool steel.

Each plate 12 has opposite faces 20 and one or more slots 22 extending along the face between opposite ends 24 of the slot. Although it is envisioned that the slot 22 may be formed to extend only partially through the plate 12, in the most preferred embodiment the slot extends entirely through the plate between the opposite faces 20. Further, although each plate 12 shown in FIG. 2 has only one slot 22, those skilled in the art will appreciate that a plate may have more than one slot without departing from the scope of the present invention. In addition, the plate 12 has one or more alignment holes 26 for accepting alignment pins 28 to align the features of the plate with the bodies 14.

Each body 14 has one or more surfaces 30 adapted to sealingly engage a face 20 of an adjoining plate 12. The bodies 14 also have one or more alignment holes 32 for accepting the alignment pins 28. The plates 12 and bodies 14 are stacked so the surfaces 30 of the bodies overlie the slot 22. Thus, a portion of the surface 30 and the slot 22 at least partially define a passage, generally designated by 34, for transporting fluid between the ends 24 of the slot.

At least one of the bodies 14 in the system 10 also includes an inlet 40 aligned with the slot 22 in the plate 12 for admitting pressurized fluid to the passage 34. In addition, one or more bodies 14 includes an outlet 42 aligned with the slot 22 in the plate 12 for emitting pressurized fluid from the passage. In the most preferred embodiment, a fluid actuated apparatus such as a hydraulic cylinder 44 or a workpiece support 46 is mounted on the bodies 14 in fluid communication with each of the outlets 42. The cylinders 44 are operatively connected to conventional clamps (not shown) of tooling fixtures (not shown) for clamping a workpiece to the fixture. The cylinder 44 moves the clamp between a closed position in which the clamp holds the workpiece in position on the i fixture and an open position in which the clamp permits removal of the workpiece from the fixture. The workpiece supports 46 move between a deployed position for supporting the workpiece on the fixture and a retracted position for loading the workpiece on the fixture.

Figure 3:
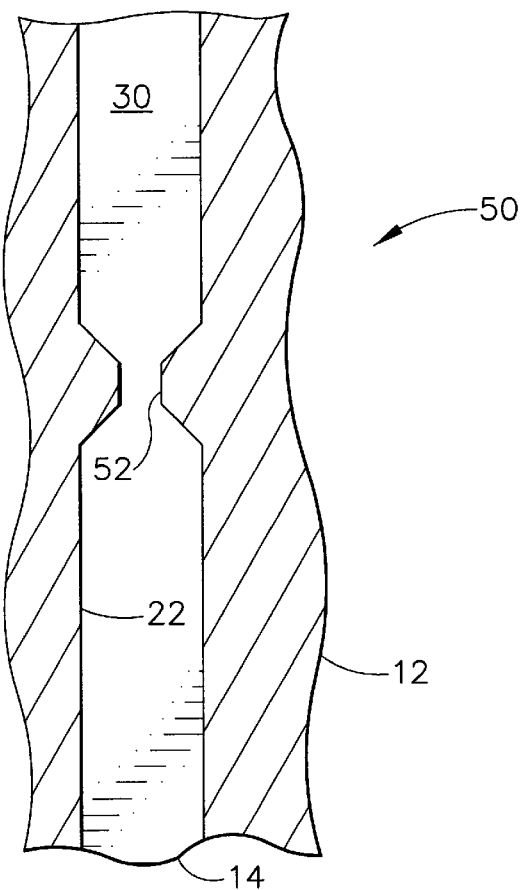
FIG. 3 is a detail of the system showing an orifice formed along a slot in a plate.
Figure 4:
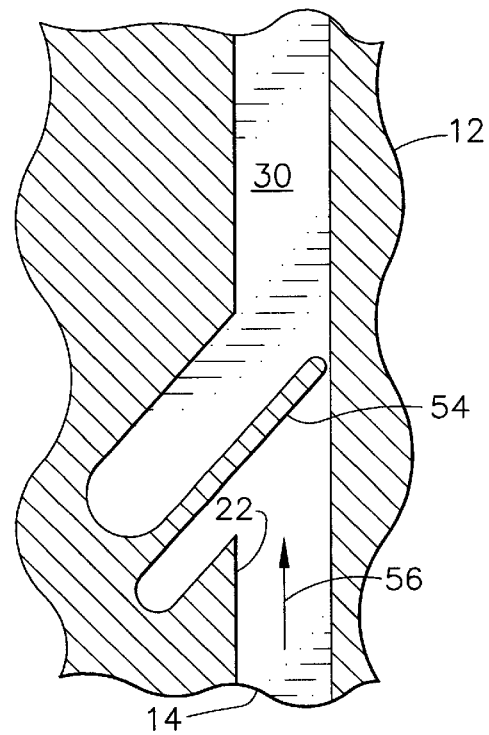
FIG. 4 is a detail of the system showing a check valve formed along a slot.

Further, the plate 12 may include one or more flow control devices, generally designated by 50, formed along the slot 22. As illustrated in FIG. 3, the flow control device 50 may be an orifice 52 for restricting a rate of fluid flow through the passage 34. Alternatively, the flow control device 50 may be a resiliently flexible check valve 54 for permitting fluid flow through the passage 34 in only one direction as indicated by an arrow 56 in FIG. 4. When fluid flows in the direction of the arrow 56, the fluid forces the valve 54 away from the side 58 of the slot 22 to permit flow through the passage between the valve and the side of the slot. However, when fluid flow reverses (opposite the arrow 56), the fluid forces the valve 54 against the side 58 of the slot to block the passage 34.

Figure 5:
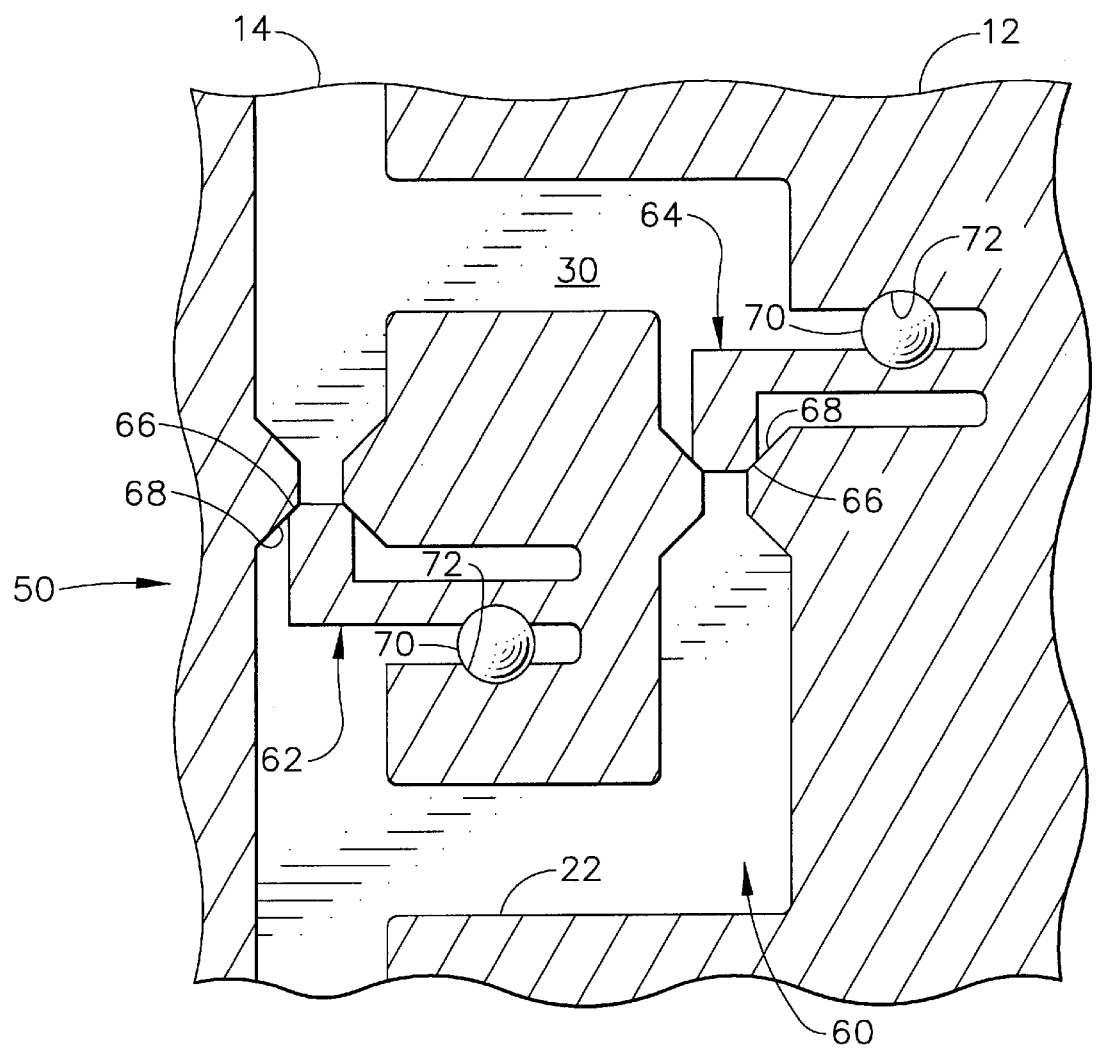
FIG. 5 is a detail of the system showing valving formed along a slot.

As illustrated in FIG. 5, the flow control device 50 may also include more complex valving, generally designated by 60. The valving 60 includes one valve, generally designated by 62, which only permits fluid flow through the passage when fluid pressure in the passage 34 exceeds a predetermined minimum value which is determined by the flexure stiffness of the valve. In addition, the valving 60 includes a second valve, generally designated by 64, which permits reverse fluid flow through the passage when pressure in the passage 34 exceeds a much lower predetermined value. Both valves 62, 64 have cantilevered heads 66 which engage seats 68 formed in the slots 22. Because the heads 66 and seats 68 are formed from a single piece of material, they are initially spaced by a small gap (not shown) due to kerf loss. To close this gap, a spacer 70 such as a ball bearing is wedged between the valve 60, 62 and a corresponding recessed wall 72 of the passage 34 to force the head toward the seat.

To make the fluid distribution system 10 described above, the plates 12 and bodies 14 are machined to the overall shapes required to make the fixture. The slots 22 are formed in the plates 12 using a conventional machining process such as wire electrical discharge machining. The mating surfaces 30 of the body 14 and the faces 20 of the plate 12 are prepared (e.g., by grit blasting to a 125 surface roughness) to enhance the adhesive capability of an adhesive sealant used to bond the plates and bodies together. The adhesive sealant is applied to the faces 20 of the plates 12 and surfaces 30 of the bodies 14 and the plates and bodies are stacked on the alignment pins 28 so the surfaces 30 sealingly engage the faces 20 of the plates. Although other adhesive sealants may be used without departing from the scope of the present invention, the adhesive sealant of the preferred embodiment is Supreme 10HT polymer adhesive sealant available from Master Bond Inc. of Hackensack, N.J. The adhesive sealant is allowed to cure to bond the bodies 14 to the plates 12.

A simple test system 10, was made using the method described above and pressure tested to determine its strength. The system 10 was pressurized to 6000 psi with hydraulic fluid for two hours before releasing the pressure. The system 10 was then pressurized to delamination which occurred at approximately 7000 psi. These pressures are well above the pressures needed to actuate conventional hydraulic cylinders used on tooling fixtures.

When introducing elements of the present invention or the preferred embodiment(s) thereof, the articles "a", "an", "the" and "said" are intended to mean that there are one or more of the elements. The terms "comprising", "including "and "having "are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A fluid distribution system for transporting pressurized fluid comprising:
   a plate having a first face and a slot extending along the first face between opposite first and second ends of the slot; and
   a body having a surface sealingly engaging said first face of the plate and overlying the slot so that a portion of the surface and the slot at least partially define a passage for transporting pressurized fluid between said first and second ends of the slot;
   wherein said first end of the slot is in fluid communication with an inlet for admitting pressurized fluid to the passage and said second end of the slot is in fluid communication with an outlet for emitting pressurized fluid from the passage.

2. A system as set forth in claim 1 further comprising a fluid actuated apparatus in fluid communication with the outlet.

3. A system as set forth in claim 2 in combination with a tooling fixture having a clamp, wherein the fluid actuated apparatus is a hydraulic cylinder operatively connected to the clamp for moving the clamp between a closed position in which the clamp holds a workpiece in position on the fixture and an open position in which the clamp permits removal of the workpiece from the fixture.

4. A system as set forth in claim 2 in combination with a tooling fixture, wherein the fluid actuated apparatus is a workpiece support which moves between a deployed position for supporting a workpiece on the fixture and a retracted position for loading the workpiece on the fixture.

5. A system as set forth in claim 2 wherein the fluid actuated apparatus is a hydraulically actuated cylinder.

6. A system as set forth in claim 1 wherein the plate and the body are adhesively bonded together.

7. A fluid distribution system for transporting pressurized fluid comprising:
   a plate having a first face and a slot extending along the first face between opposite first and second ends of the slot;
   a body having a surface sealingly engaging said first face of the plate and overlying the slot so that a portion of the surface and the slot at least partially define a passage for transporting pressurized fluid; and
   a flow control device positioned along said slot.

8. A system as set forth in claim 7 wherein the flow control device includes an orifice for restricting fluid flow through the passage.

9. A system as set forth in claim 7 wherein the flow control device includes a check valve for permitting fluid flow through the passage in only one direction.

10. A system as set forth in claim 7 wherein the flow control device includes valving which only permits fluid flow through the passage when fluid pressure in the passage exceeds a predetermined minimum value.

11. A fluid distribution system for transporting pressurized fluid comprising:
   a plate having a first face, a second face opposite said first face, and a slot extending entirely through the plate from said first face to said second face and along the first face between opposite first and second ends of the slot;
   a first body having a surface sealingly engaging said first face of the plate and overlying the slot so that a portion of the surface and the slot at least partially define a passage for transporting pressurized fluid between said first and second ends of the slot; and
   a second body having a surface sealingly engaging said second face of the plate and overlying the slot.

12. A fluid distribution system for transporting pressurized fluid comprising:
   a plate having opposite first and second faces and a slot extending through the plate from said first face to said second face and along the plate between opposite first and second ends of the slot;
   a first body sealingly engaging said first face of the plate and overlying the slot; and
   a second body sealingly engaging said second face of the plate and overlying the slot so that the slot and portions of said first and second bodies define a passage for transporting pressurized fluid between said first and second ends of the slot.

13. A system as set forth in claim 12 wherein said first and second bodies are adhesively bonded to said first and second faces of the plate, respectively.

14. A method of making a fluid distribution system for transporting pressurized fluid comprising the steps of:
   forming a slot in a plate having opposite first and second faces so that the slot extends along the plate between opposite first and second ends of the slot;
   bonding a body to said first face of the plate to form a passage for transporting pressurized fluid between said first and second ends of the slot;
   placing said first end of the slot in fluid communication with an inlet for admitting pressurized fluid to the passage; and
   placing said second end of the slot in fluid communication with an outlet for emitting pressurized fluid from the passage.

15. A method of making a fluid distribution system for transporting pressurized fluid comprising the steps of:
   forming a slot in a plate having opposite first and second faces so that the slot extends entirely through the plate between said first and second faces and along the plate between opposite first and second ends of the slot;
   sealingly engaging a first body with said first face of the plate so the first body overlies the slot and a portion of said first body and the slot at least partially define a passage for transporting pressurized fluid; and
   sealingly engaging a second body with said second face of the plate so the second body overlies the slot and a portion of said second body and the slot at least partially define the passage for transporting pressurized fluid.

* * * * *